Oct. 10, 1950   J. B. WALKER   2,525,160
CAMERA AND FLASH LAMP SYNCHRONIZING
DEVICE, INCLUDING AUXILIARY SHUTTER
Filed April 28, 1947   2 Sheets-Sheet 1

INVENTOR.
JOSEPH B. WALKER
BY
Westall & Westall
ATTORNEYS

Oct. 10, 1950               J. B. WALKER              2,525,160
CAMERA AND FLASH LAMP SYNCHRONIZING
DEVICE, INCLUDING AUXILIARY SHUTTER
Filed April 28, 1947                                    2 Sheets-Sheet 2
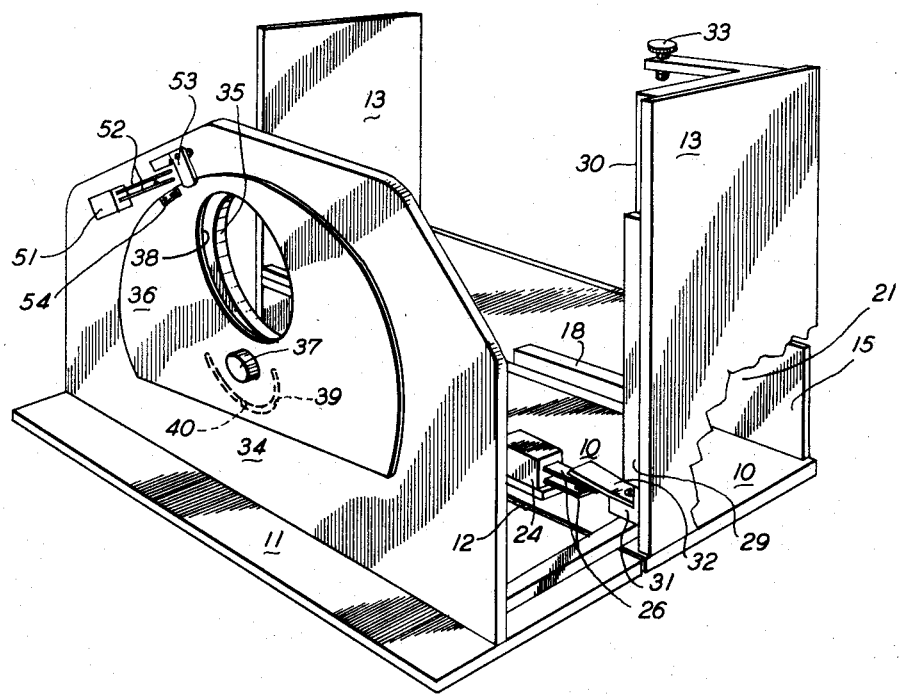
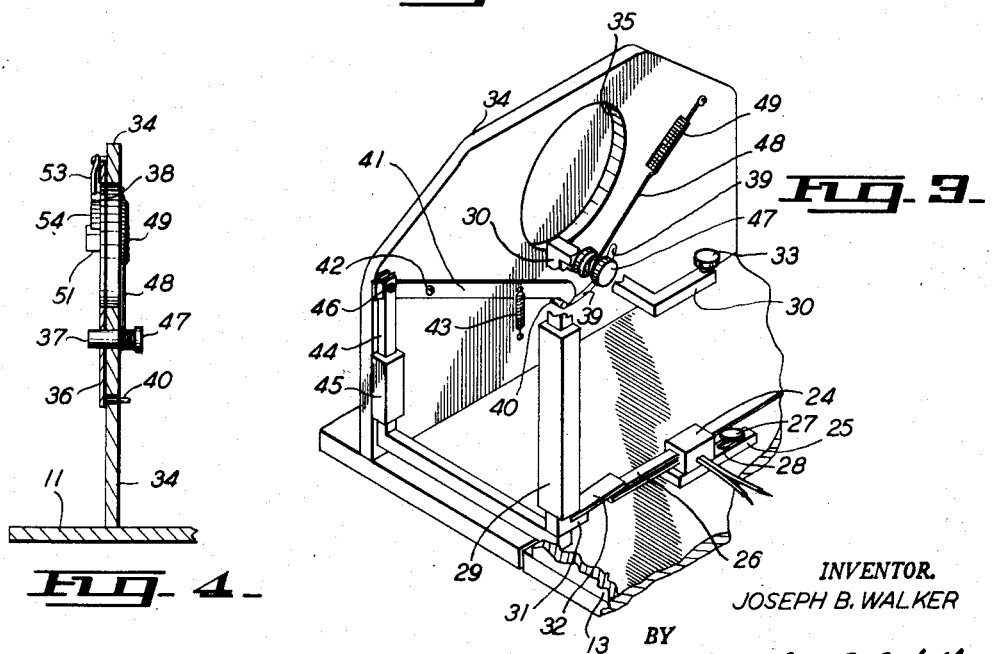
INVENTOR.
JOSEPH B. WALKER
BY
Westall & Westall
ATTORNEYS Patented Oct. 10, 1950

2,525,160

UNITED STATES PATENT OFFICE 2,525,160

CAMERA AND FLASH-LAMP SYNCHRONIZING DEVICE, INCLUDING AUXILIARY SHUTTER

Joseph B. Walker, Hollywood, Calif.

Application April 28, 1947, Serial No. 744,438

4 Claims. (Cl. 95—11.5)

This invention relates to camera frames, and more specifically contemplates supporting structure for cameras and photo-flash equipment embodying mechanism by which the exposure and the flash may be critically synchronized.

Many miniature cameras of conventional construction are adapted for assembly therewith of photo-flash equipment which incorporates combination switch and shutter actuating mechanism intended to synchronize the opening of the camera shutter with the illumination of the field by the flash bulb. As most miniature cameras combine focal plane shutters with very fast lens systems, a high degree of precision in the actuating mechanism control is necessary in order to obtain the required synchronization between the peak of illumination of the flash and full shutter opening. However, as most conventional controls consist of Bowden wires, springs or lever combination, perfect synchronization is impossible due to mechanical play, spring fatigue, and backlash of this mechanism in operation.

It is common practice to attach the photo-flash equipment to the side or to one end of the cameras by means of a suitable bracket. However, due to the small size of miniature cameras and particularly their narrow bases as compared to the weight and size of the photo-flash equipment, conventional mechanism of this type invariably unbalances the camera and thereby increases the difficulty of handling the same during use and interferes with the proper support of the camera upon a flat surface such as the floor or a table.

A principal object of the present invention is to provide a device for mounting both photo-flash equipment and a miniature camera with which the flash equipment is to be employed, including mechanism for actuating both the shutter control of the camera and the switch of the flash equipment, absolute synchronization being effected incident to the integrality of the actuating mechanism.

Another and highly important object hereof is the provision of a mounting for conventional electronic flash equipment to which the camera may be releasably attached, embodying an auxiliary shutter operable to normally reduce the light permitted to reach the camera to immaterial proportion, in combination with a switch for controlling the flash actuated in response to opening movement of the auxiliary shutter, whereby the camera shutter may be initially opened and remain open during the entire synchronized operation of the auxiliary shutter and flash, so as to assure the occurrence of the flash at the moment of full displacement of the shutter combination from the line of collimation.

Another object is to provide a common sectional base for a miniature camera and photo-flash equipment, whereby the assembly may be operatively associated and supported upon the floor or a table in upright position, the sections of the base being hinged together to form a movable forward projection adapted, selectively, to support auxiliary shutter mechanism or form a closure for the frame when the camera is not in use.

More specifically, an object hereof is the provision of a camera frame embodying guides and attaching means to secure a camera therein with the trigger for the shutter thereof disposed in operative relationship with an actuating device forming a part of the frame, in combination with a photo-flash support electrically controlled by a switch adapted to be closed coincidentally with the operation of a shutter-actuating device, wherein removal and re-installation of the camera may be effected without disturbing the essential perfect synchronization of the flash and full shutter opening that such proper adjustment assures.

Simplicity of construction, ease of operation, economy of manufacture, and convenience and facility in use constitute other objects hereof, as will be apparent from the following description read in the light of the accompanying drawings, in which:

Fig. 2 is a perspective view of the apparatus shown in Fig. 1, taken from the opposite side and with the closure plate for the lower compartment removed, and illustrating particularly the attachment which adapts the unit for electronic flash equipment;

Fig. 3 is a broken perspective view of the back of the electronic flash control panel depicting the mechanism by which the auxiliary shutter device is actuated;

Fig. 4 is a vertical section taken through the panel of the electronic flash control mechanism;

Figure 1:
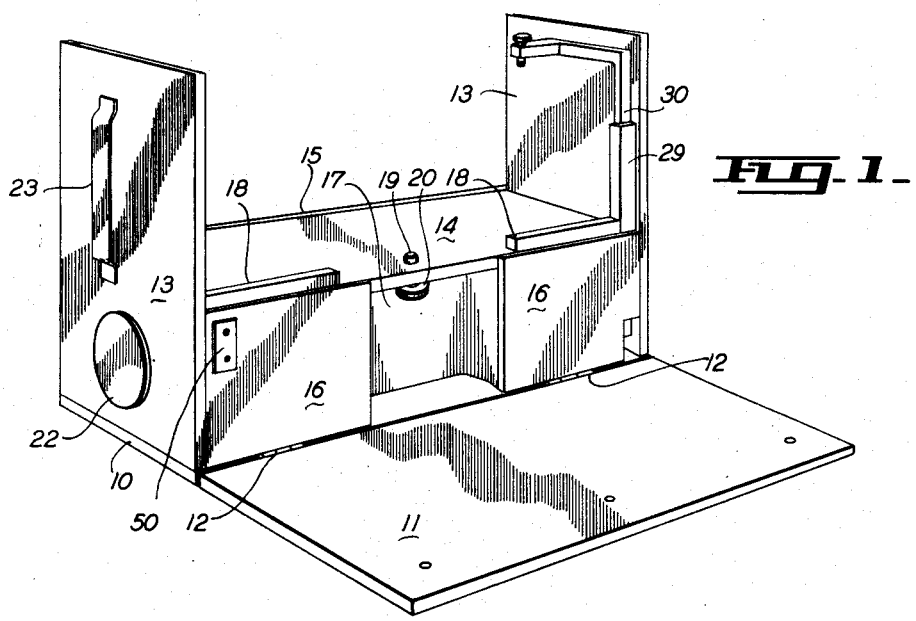
Fig. 1 is a perspective view of one embodiment of my invention.
Figures 5, 6:
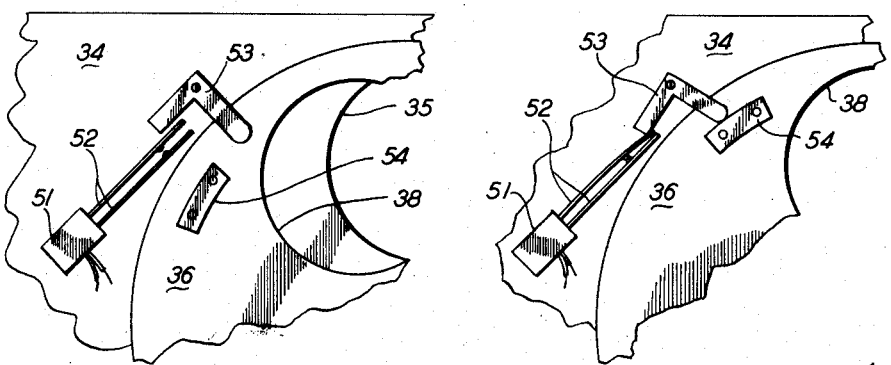
Figs. 5 and 6 are broken elevations of the electronic-flash panel and auxiliary shutter plate pivoted thereto, depicting particularly the switch mechanism and the means by which it is operated in two different positions.
Figure 7:
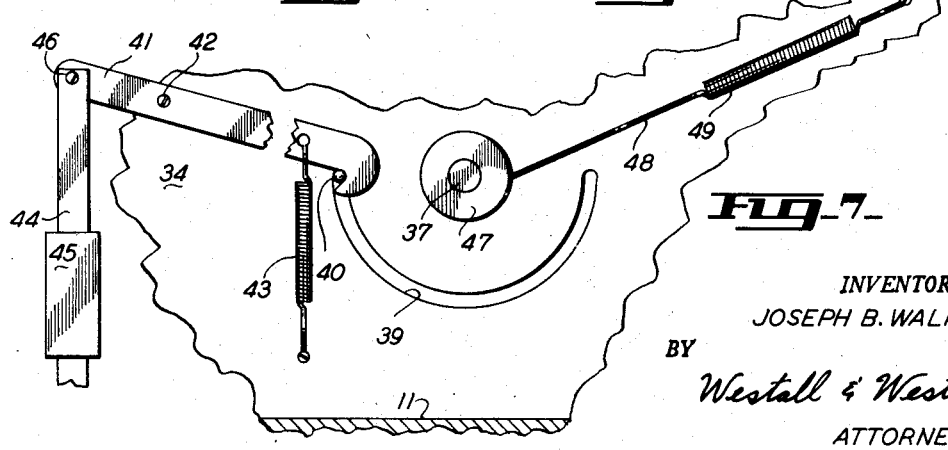
Fig. 7 is a broken elevation of the back of the panel, illustrating the means for latching the auxiliary shutter plate in inoperative position and the means by which it is released and actuated.

Referring to the drawings in detail, the numerals of which indicate similar parts throughout the several views, 10 and 11 indicate the two parts of a sectional base hinged together as indicated at 12, so as to enable the section 11 to assume a position perpendicular to the base section 10 when these parts are in inoperative relationship, but normally to provide an extension of the base section 10. Rigidly secured to the ends of the section 10 of the base are upright side plates 13, against the forward edges of which the section 11 is adapted to be moved when the base is in folded relationship. The length of section 10, i. e., the distance between the side plates 13, correspond substantially to the length of the camera for which the apparatus is adapted, so as to accommodate the camera therebetween for support upon a horizontally-disposed bed plate 14 parallel to, but suspended above, the base by the side plates 13. The area between the base section 10 and the bed 14 is enclosed at the back by a hinged side element 15 and at the forward side by end plates 16 and an intermediate arcuate re-entering connecting plate 17.

As will appear, it is essential that the camera be critically positioned upon the bed with respect to other apparatus hereinafter described, and accordingly to this end a pair of guide rails 18 are secured to the forward marginal edge of bed 14, providing stops against which the camera may be placed. A screw 19, threaded upwardly through the middle and adjacent the forward edge of bed 14, is provided with a knurled head 20 accessible from the underside of the bed due to the inward displacement of the arcuate wall 17 so as to threadedly engage the camera when the latter is in position against rails 18 and thereby hold the same in the required position.

In one side of the compartment 21 formed below the bed plate 14, batteries or electric current generating apparatus (not shown) of conventional construction may be housed. The battery compartment 21 is accessible through a circular opening in the adjacent side plate 13, which opening is normally sealed by a threaded plug 22. Above the opening a bracket 23 is mounted to side plate 13 for the attachment of conventional photo-flash equipment of any well-known type including electronic-flash apparatus. The circuit through the photo-flash and source of electricity is controlled by a switch 24 within compartment 21 adjacent the opposite side plate 13. Switch 24 is of conventional construction, and comprises a box mounted securely upon a strip 25 slidable upon the base section 10 and a pair of resilient contacts 26 projecting out of the box toward the adjacent side plate 13. Strip 25 is normally secured to the base section 10 by a screw 27 which extends through a slot 28 in the strip, but, with the screw loosened, the strip and switch 24 may be shifted longitudinally within the limits defined by the ends of slot 28 toward and away from the side plate. The contacts 26 are normally in parallel, spaced relationship so as to maintain the circuit open, but are adapted to be brought into engagement in response to downwardly-directed pressure upon the upper contact 26 in response to the actuation of means about to be described.

Secured to the inner surface of side plate 13 nearest adjacent switch 24, is a vertically-arranged square-tubular guide 29 through which a control bar 30 slidably projects. The lower end of the bar 30 is formed with a foot 31 to which an adjusting cam strip 32 is secured. The strip 32 is inclined upwardly and overlies the outer end of the upper switch contact 26 so as to depress the latter and close the switch in response to depression of bar 30. Adjacent the top of side plate 13, the bar 30 extends parallel to the upper edge of plate 13 so as to overhang the adjacent end of a camera installed upon the bed plate 14. In alignment with the shutter trigger of a camera, properly installed, the end of bar 30 is again bent at right angles over the camera and carries in its outer end a thumb screw 33 vertically aligned with the trigger of the shutter.

It will be observed that by shifting switch 24 on base plate 10 toward and away from the foot 31 of the control bar 30, the degree of vertical movement of the latter required to effect closure of the switch will be varied, due to the incline of the cam strip 32. Accordingly, by complementary sliding adjustment of switch 24 and threaded adjustment of the thumb screw 33, synchronization of the shutter-actuating mechanism and energization of the photo-flash equipment may be effected. After the essential adjustment of these parts is accomplished, the camera may be removed by releasing the screw 19 and may be re-installed against the guide rails 18 without disturbing the pre-adjustment of the thumb screw 33 and switch essential to effective synchronization.

During use of the assembly, the forwardly-projecting section 11 of the base is lowered to the position illustrated in Fig. 1, but is adapted to enclose the front of the frame and afford protection for camera when the latter is not in use, and thereby facilitate handling of the composite assembly. Accordingly, suitable latches (not shown) may be provided to connect the outer end of the base section 11 with the forward edges of the side plates 13. The compartment 21 below the bed plate 14 may be utilized as a storage cabinet for the photo-flash equipment when the latter is disengaged from the bracket 23.

Electronic-flash light equipment of the prior art is highly desirable for use with cameras of the type herein contemplated, but, with conventional mechanism for controlling the essential synchronization of the flash and shutter, this type of flashlight equipment cannot be effectively employed. This is due to the fact that the electronically-produced flash is of such short duration that mechanical synchronization is impossible unless the switch is actuated directly by the shutter mechanism. In order to attain this result and adapt miniature cameras for the utility of electronic flash equipment, I provide an attachment illustrated in Figs. 2 to 7 inclusive. This mechanism comprises a vertical panel 34 adapted to be mounted upon the base section 11 perpendicular to and intersecting the lens axis of a camera mounted upon the bed plate 14. Panel 34 is formed with a circular aperture 35 in coaxial alignment with the lens and of a size adapted to encompass the light rays to form the desired image upon the objective lens of the camera. The aperture 35 is normally closed by a shutter plate 36 pivoted for movement over panel 35 upon a short shaft 37 directly below the aperture 35. The shutter plate 36 is formed with a complementary circular aperture 38, of a size corresponding to that of aperture 35 and displaced from shaft 37 a like distance, whereby arcuate movement of the shutter plate is effective to register the apertures 35 and 38 and transmit the light reflected from the field to the camera. Panel 34 is sufficiently close to the camera-supporting frame to mask out all light rays of material intensity from the lens when the apertures 35 and 38 in the panel 34 and shutter plate 36, respectively, are misaligned. Directly below shaft 37 a semi-circular slot 39 is formed in panel 34 through which projects a pin 40 carried by the rearward surface of the shutter plate 36. The length of slot 39 and disposition of pin 40 are such to permit a range of pivotal movement of shutter plate 36 effective to misalign the aperture 38 to either side of the centrally-located aperture 35 in the panel, pin 40 being intermediate the ends of slot 39 when the apertures are in registry.

The shutter plate 36 is normally held in an extreme position with pin 40 abutting against the end of slot 39 nearest adjacent the side of the assembly at which the control bar 30 is located, and is there engaged by a latch 41 fulcrumed at 42 to the back of panel 34. The pin-engaging end of latch 41 is normally held in such position, by means of a helical spring 43 connected between latch 41 and a point on the panel therebelow. Latch 41 is adapted to be displaced from its normal pin-engaging position by means of an L-shaped bar 44, one side of which extends in a vertical position through a tubular guide 45 attached to the back of panel 34 below the end of latch 41 opposite to that adapted to engage pin 40. The upper end of the upright section of the bar is bifurcated to receive the adjacent end of latch 41 to which it is pivoted, as indicated at 46. The opposite side of bar 44 extends rearwardly parallel to base 10—11 to a point directly below the foot 31 of the control bar 30. It will be appreciated that the tension exerted upon the latch 41 by spring 43 is effective to normally hold the bar 44 above the base and in contact with the foot 31 of control bar 30.

In order to compel arcuate movement of the shutter plate 36, the shaft 37 on which the latter is pivoted extends rearwardly of the panel and is grooved to form a spool 47 around which a cord 48 is wound. One end of cord 48 is secured by suitable means to spool 47, and the opposite end extends tangentially from the spool for attachment to a helical spring 49 suspended from suitable means attached to the back of the panel. It will thus be observed that pressure of the control bar 30 transmitted through bar 44 to the pivoted end of latch 41 disengages the latch from the pin 40, whereupon the tension of spring 49 transmitted to spool 47 of shaft 37 through the cord 48 is effective to rapidly swing the shutter plate 36 from one end to the opposite end of its range of movement as limited by the slot 39, and during such movement momentarily register the aperture 38 in shutter plate 36 with the aperture 35 in the panel 34. 50 indicates a jack connected to the leads from the source of electrical energy through the switch 24 to facilitate electrical assembly of the photo-flash equipment in the circuit.

The electronic-flash equipment for which the panel 34 and associated mechanism is provided is energized through a switch 51 mounted upon a forward surface of panel 34 adjacent the edge of the shutter plate 36. The projecting parallel and normally-spaced spring contacts 52 of switch 51 extend into the angle of a bell crank 53, the ends of which are offset relative to one another for a purpose later described, pivoted to the panel 34 adjacent shutter plate 36. One side of bell crank 53 overhangs the marginal edge of plate 36 so as to project into the line of movement of a block 54 secured to the plate. Disengagement of the latch 41 from pin 40 with the consequent arcuate movement of the shutter plate 36 results in block 54 engaging the bell crank 53 immediately prior to the registry of the apertures 35 and 38 in the panel 34 and shutter plate 36, respectively, so as to swing the opposite end of bell crank 53 against one of the spring contacts 52 and thereby close the switch 51. The length of block 54 determines the period during which the switch will remain closed. This period, and accordingly the length of the block 54, is only sufficient to assure energization of the electronic-flash equipment controlled by the switch. It will be understood that the switch 24 is omitted from the circuit when the electronic flash control mechanism is to be used.

Due to the actuation of switch 51 directly by the shutter plate 36, perfect synchronization can be effected between the registry of the apertures 35 and 38 and the occurrence of the flash by which the field is to be illuminated. However, it is also necessary that the shutter of the camera be open at the precise moment the apertures are in registry in order to transmit to the film the image of the illuminated field. Accordingly, in the use of this apparatus the camera is initially adjusted for a time exposure. When the control bar 30 is depressed, the lower end of the adjusting screw 33 actuates the shutter trigger of the camera as hereinbefore described, so as to open the shutter of the camera coincidentally with the disengagement of latch 41, i. e., at the beginning of the swing of shutter plate 36, and assure the continued displacement of the camera shutter during operation of the auxiliary shutter plate. Thus the camera shutter will be open at the moment the synchronized flash and registry of the apertures 35 and 38 occurs. The camera shutter may then be closed by a second depression of the control bar 30 and adjusting screw 33. This latter operation of the bar 30 has no effect upon the shutter plate 36, the latter having already reached the end of its swing. The shutter plate may be manually re-set by reversing its movement and again engaging the latch 41. On the return stroke of the shutter plate, block 54 will engage the bell crank 53 but will tilt it in the opposite direction and, due to the offset of the opposite ends of the bell crank, the switch 51 will remain open.

While I have shown a single preferred construction embodying my invention together with auxiliary mechanism for adapting the unit to electronic-flash equipment, it will be appreciated that numerous changes in size, design, shape, number and proportion of the various parts may be made, that the frame may be provided with a handle if desired, that the source of electricity for the flash light equipment may consist of batteries carried in the usual case adapted to be mounted to bracket 23, and that other conventional means, e. g., clamps etc., may be employed to releasably secure the camera in the frame— all without departing from the spirit of my invention as defined in the appended claims.

What I claim and desire to secure by Letters Patent is:

1. In a device of the character described for a camera having a lens and a shutter, a base, means to mount the camera upon said base, flash mechanism supported by said base, a stationary plate mounted upon said base in front of the camera and having an opening therein coaxial with the lens of the camera, an auxiliary shutter plate having a hole therein registerable with said opening in said stationary plate, means to shift said auxiliary shutter plate to momentarily register the hole therein with said opening, means comprising a switch to actuate said flash mechanism means actuated by the movement of said shutter plate to energize said switch, locking means to normally hold said auxiliary shutter plate in a position with said hole and opening out of registry, and means to coincidentally actuate the shutter of the camera and release said locking means.

2. In a device of the character described for a camera having a lens and shutter control, an electrical illuminating device for illuminating the scene to be photographed, a base for the camera, an auxiliary shutter carried by said base in front of the lens of the camera, a switch controlling said electrical illuminating device, means to open and close said auxiliary shutter, means comprising a manually operable element to coincidentally actuate said shutter control of the camera and said last-named means, and means actuated by said auxiliary shutter to energize said switch.

3. In a device of the character described for a camera having a lens and shutter control, electrical means for illuminating the scene to be photographed, a base for the camera, an auxiliary shutter carried by said base in front of the camera, a switch energized by said auxiliary shutter to energize said electrical means, means to actuate said auxiliary shutter, a latch to normally retain said last-named means inoperative, and a rigid member carried by said base having one end disposed above the shutter control of the camera and its opposite end engaged with said latch whereby depression of said rigid member is effective to actuate said shutter control and coincidentally release said latch.

4. In a device of the character described for a camera having a lens and shutter control, electrical means for illuminating the scene to be photographed, a base for the camera, a stationary plate mounted upon said base in front of the camera and having an opening therein coaxially aligned with the lens of the camera, an auxiliary shutter plate having a hole therein, means to pivot said shutter plate to said stationary plate whereby relative pivotal movement of said plates is effective to momentarily register said hole and opening, resilient means to pivot said shutter plate, a latch to normally retain said shutter plate in a position with the hole therein out of registry with the opening in aid stationary plate, a rigid member slidably arried by said base having one end thereof overhanging said shutter control of the camera, and the opposite end thereof engageable with the latch, operable upon depression to actuate said shutter control and release said latch, and a switch controlling said electrical means, energized in response to actuation of said auxiliary shutter.

JOSEPH B. WALKER.

REFERENCES CITED

The following references are of record in the file of this patent:

UNITED STATES PATENTS

| Number | Name | Date |
|---|---|---|
| 943,232 | Ashe | Dec. 14, 1909 |
| 1,545,421 | Giacobi | July 7, 1925 |
| 1,818,162 | Robbins et al. | Aug. 11, 1931 |
| 1,858,691 | Stroecker | May 17, 1932 |
| 1,896,585 | Johnson | Feb. 7, 1933 |
| 1,960,722 | Aldeman | May 29, 1934 |
| 2,238,115 | Johnson | Apr. 15, 1941 |
| 2,298,382 | Hutchison et al. | Oct. 13, 1942 |
| 2,311,440 | Jacobson | Feb. 16, 1943 |
| 2,317,465 | Kende et al. | Apr. 27, 1943 |
| 2,362,863 | Sprague et al. | Nov. 14, 1944 |
| 2,422,077 | Bucky | June 10, 1947 |

OTHER REFERENCES

British Journal of Photography, March 28, 1941, page 151, published in London, England.